United States Patent
Sanmartin et al.

(10) Patent No.: US 10,613,244 B2
(45) Date of Patent: Apr. 7, 2020

(54) FOCUSED SYMMETRIC PIPE INSPECTION TOOLS

(71) Applicant: Halliburton Energy Services, Inc., Houston, TX (US)

(72) Inventors: Luis Emilio Sanmartin, Houston, TX (US); Reza Khalaj Amineh, Houston, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/909,912

(22) PCT Filed: Jun. 17, 2015

(86) PCT No.: PCT/US2015/036154
§ 371 (c)(1),
(2) Date: Feb. 3, 2016

(87) PCT Pub. No.: WO2016/007267
PCT Pub. Date: Jan. 14, 2016

(65) Prior Publication Data
US 2016/0187523 A1    Jun. 30, 2016

Related U.S. Application Data

(60) Provisional application No. 62/023,654, filed on Jul. 11, 2014.

(51) Int. Cl.
*G01V 3/28* (2006.01)
*E21B 47/00* (2012.01)
(Continued)

(52) U.S. Cl.
CPC ............... *G01V 3/28* (2013.01); *E21B 47/00* (2013.01); *G01N 27/82* (2013.01); *G01V 3/18* (2013.01); *G01V 3/36* (2013.01)

(58) Field of Classification Search
CPC combination set(s) only.
See application file for complete search history.

(56) References Cited

U.S. PATENT DOCUMENTS 2,881,387 A    4/1959 Wood
3,150,314 A  * 9/1964 Tanguy ................... G01V 3/28
                                                    324/339

(Continued)

FOREIGN PATENT DOCUMENTS

EP        0019091 A1   11/1980
WO    2016007267 A1    1/2016

OTHER PUBLICATIONS

International Search Report and Written Opinion for PCT/US2015/036154 dated Oct. 6, 2015.

(Continued)

*Primary Examiner* — Minh Q Phan
(74) *Attorney, Agent, or Firm* — Benjamin Fite; C. Tumey Law Group PLLC

(57) ABSTRACT

An electromagnetic sensor for a pipe inspection tool includes a first coil antenna having a wire wrapped about a first core in a first direction, and a second coil antenna axially offset from the first coil and the wire wrapped about a second core in a second direction. A power source is coupled to the wire such that, when excited by the power source, the first coil antenna generates a first magnetic field in a first polar orientation and the second coil antenna generates a second magnetic field in a second polar orientation opposite the first polar orientation.

15 Claims, 7 Drawing Sheets

(51) Int. Cl.
*G01N 27/82* (2006.01)
*G01V 3/36* (2006.01)
*G01V 3/18* (2006.01)

(56) References Cited

U.S. PATENT DOCUMENTS

| | | | |
|---|---|---|---|
| 4,466,287 A * | 8/1984 | Repplinger | G01N 29/043 |
| | | | 324/226 |
| 4,574,242 A * | 3/1986 | Clark | G01V 3/30 |
| | | | 324/338 |
| 4,710,711 A | 12/1987 | Walkow | |
| 5,038,107 A * | 8/1991 | Gianzero | G01V 3/28 |
| | | | 324/339 |
| 5,532,587 A | 7/1996 | Downs et al. | |
| 5,670,878 A | 9/1997 | Katahara et al. | |
| 8,319,494 B2 | 11/2012 | Simek et al. | |
| 2004/0046561 A1 * | 3/2004 | Itskovich | G01V 3/28 |
| | | | 324/339 |
| 2004/0100256 A1 | 5/2004 | Fickert et al. | |
| 2005/0088180 A1 * | 4/2005 | Flanagan | G01V 13/00 |
| | | | 324/338 |
| 2009/0062739 A1 * | 3/2009 | Anderson | A61M 25/00 |
| | | | 604/164.13 |
| 2009/0091328 A1 * | 4/2009 | Clark | G01V 3/28 |
| | | | 324/338 |
| 2009/0295393 A1 * | 12/2009 | Bespalov | G01V 3/28 |
| | | | 324/339 |
| 2011/0012799 A1 | 1/2011 | Saito | |

OTHER PUBLICATIONS

Extended European Search Report from European Patent Application No. 15819006.6. dated Oct. 20, 2017, 12 pages.

* cited by examiner

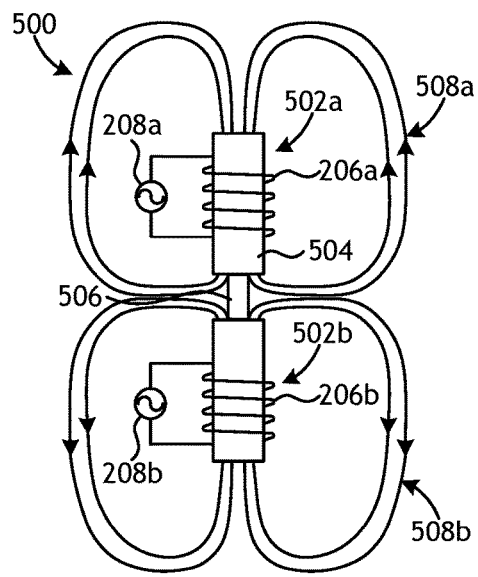
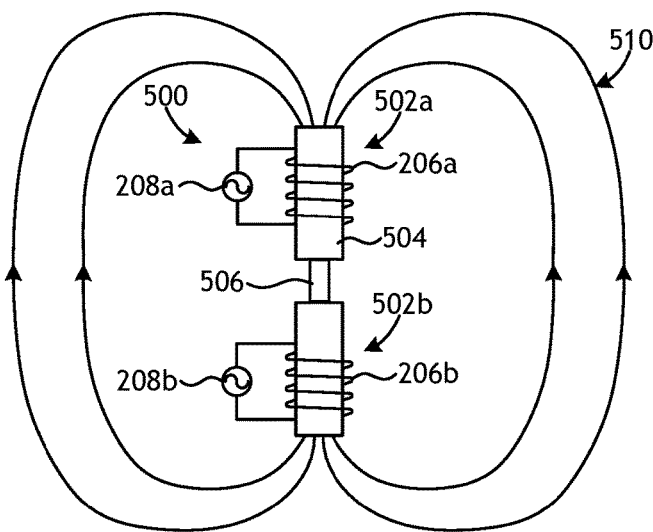
FIG. 5A  FIG. 5B
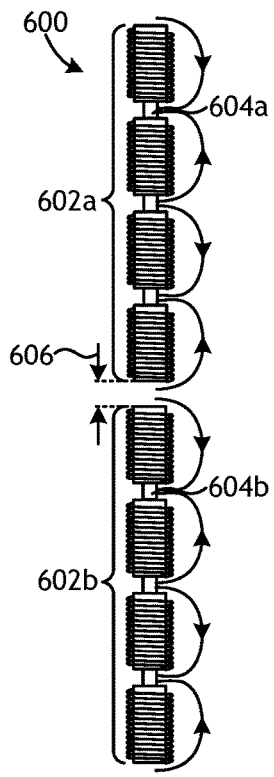
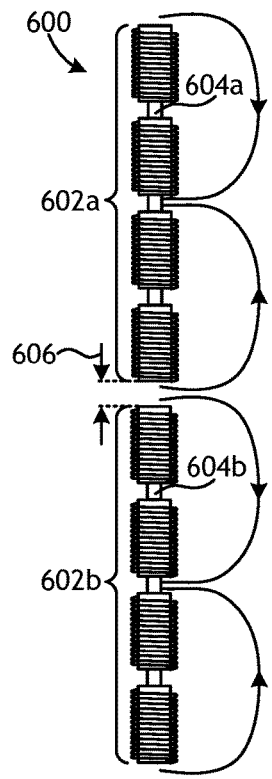
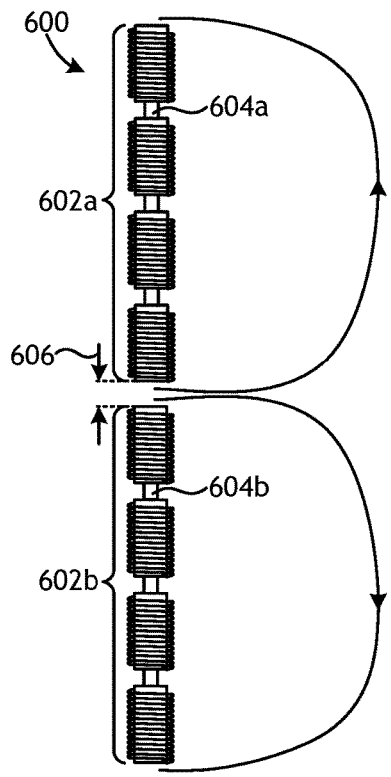
FIG. 6A  FIG. 6B  FIG. 6C

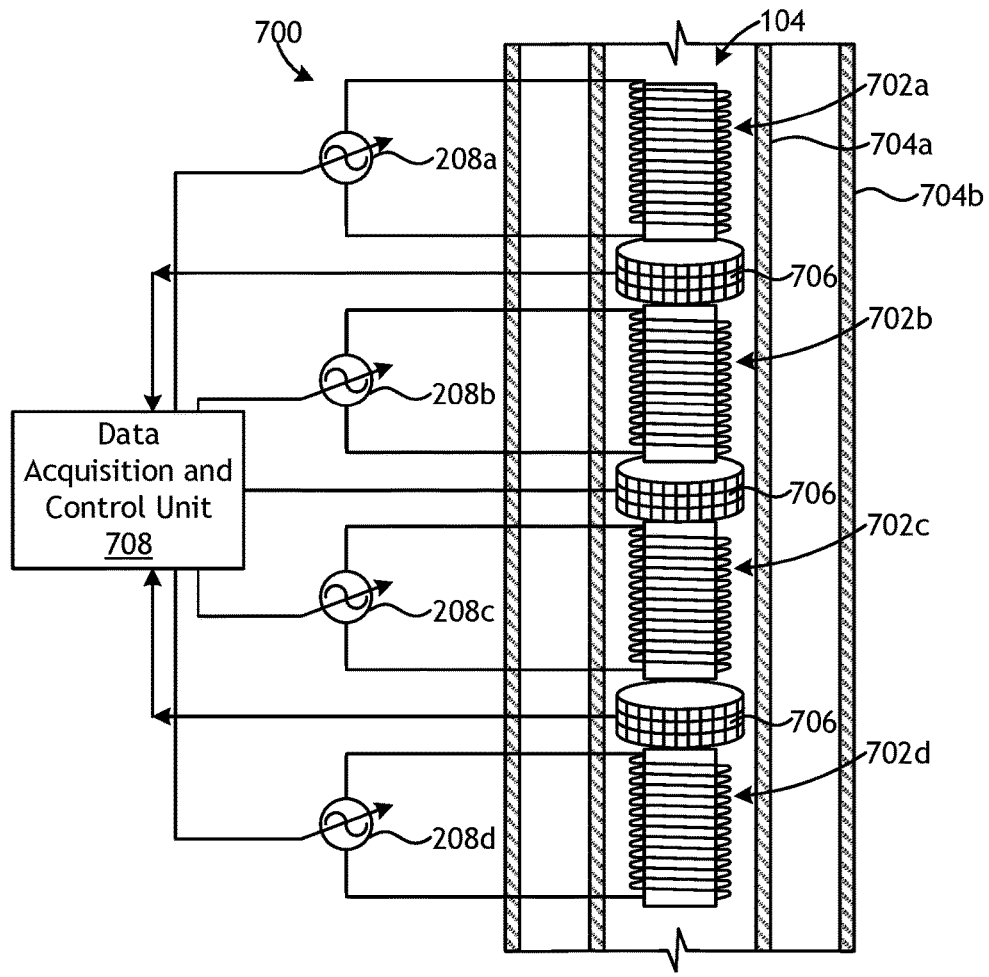
*FIG. 7*
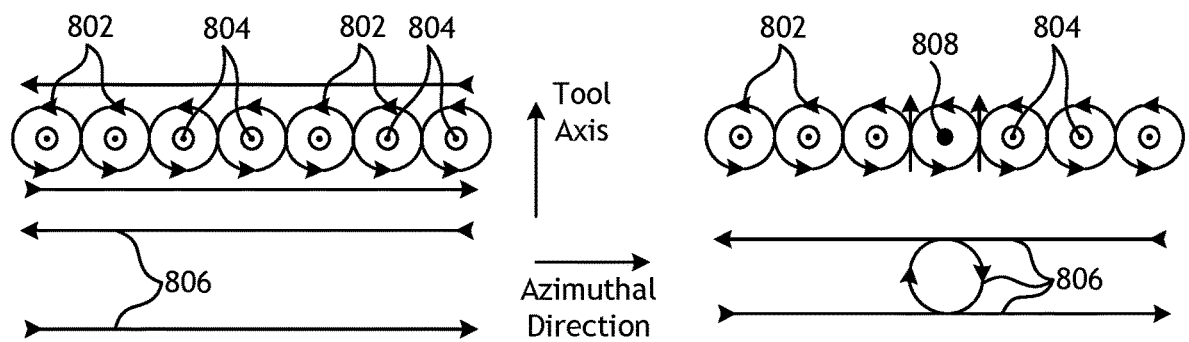
*FIG. 8A*  *FIG. 8B*

FOCUSED SYMMETRIC PIPE INSPECTION TOOLS

CROSS-REFERENCE TO RELATED APPLICATIONS

This application is the national stage application of PCT/US2015/036154 by Luis Sanmartin, filed on Jun. 17, 2015, which claims priority to U.S. Provisional Patent Application No. 62/023,654, filed on Jul. 11, 2014.

BACKGROUND

After drilling a wellbore in the oil and gas industry, the drilled wellbore can be subsequently completed by cementing a string of metal pipes connected end-to-end within the wellbore. Commonly called "casing," such pipes increase the integrity of the wellbore and provide a flow path between the earth's surface and selected subterranean formations. Some wellbores are lined with multiple concentrically-positioned pipes (i.e., concentric casings). Moreover, in some wellbores, one or more production pipes are extended into the wellbore to provide a conduit for hydrocarbons to be conveyed to the earth's surface. Accordingly, as used herein, the term "pipe" or "wellbore pipe" will refer to metal pipes or pipelines that line the walls of a wellbore, such as casing, and also production pipes extended into a wellbore to facilitate hydrocarbon production operations.

During the lifetime of a well, wellbore pipes are exposed to high volumes of materials and fluids required to pass through them, including chemically aggressive fluids. In harsh environments, the pipes may be subject to corrosion that may affect their functionality. Consequently, the structural integrity of wellbore pipes may change over time due to chemical and mechanical interactions. Moreover, due to the length, volume, accessibility difficulties, and long time periods associated with the process, it is a costly task to monitor wellbore pipes and pipelines and intervene when required. For instance, this may be a difficult task for pipes that are commonly used for the extraction of hydrocarbons, since such pipes and pipeline investigation systems are required to be exposed to elevated pressures and temperatures.

The diameter of the innermost pipe of concentric wellbore pipes limits the size of the monitoring and intervention system that can be deployed to monitor the integrity of all of the concentric pipes. Moreover, effectively monitoring the outermost pipes from the innermost pipe may be difficult since any monitoring system has to be able to sense through a number of pipe layers, each of which may have developed distinct problems or defects. In some wells, the geometry of the well can be more complicated where two eccentric production pipes are positioned inside a wellbore pipe that is concentrically arranged within multiple additional pipes. In this situation, the pipe inspection tool may be required to log from the interior of one of the production pipes and extract information from all concentric and eccentric wellbore pipes.

In conventional pipe inspection tools, the length of a coil antenna included in the pipe inspection tool controls the radial depth at which the metal thickness of the surrounding pipes can be measured. A longer coil antenna can reach a deeper radial distance, but the magnetic field created by that coil antenna spreads over a larger volume, and naturally decreases the resolution of the longer coil antenna.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIGS. 5A and 5B are schematic diagrams of another exemplary electromagnetic sensor.

FIGS. 6A, 6B, and 6C are schematic views of three embodiments of another exemplary electromagnetic sensor showing three distinct modes of operation, respectively.

FIG. 7 is a schematic diagram of another exemplary electromagnetic sensor.

FIGS. 8A and 8B schematically depict typical current flow patterns generated in wellbore pipes.

DETAILED DESCRIPTION

The present disclosure is related to wellbores inspection techniques in the oil and gas industry and, more particularly, to improved pipe inspection tools for monitoring and evaluating defects in wellbore pipes.

Embodiments of the present disclosure describe exemplary pipe inspection tools that can improve tool resolution and enhance the identification of corrosion in wellbore pipes being monitored. More specifically, multi-depth focusing pipe inspection tools are disclosed to inspect the integrity of wellbore pipes. The vertical resolution of evaluating defects may be improved significantly due to the focusing properties of the presently described tools. Briefly, the pipe inspection tools can include several pairs of coil antennas that can achieve various depths of penetration, depending on the spacing between the coil antennas, their respective lengths, and their modes of operation. Shorter depth of focus is employed to inspect the innermost wellbore pipes in a shallow mode. In contrast, longer depth of focus is employed to inspect outermost pipes in a deep mode. The capability of first evaluating the innermost pipes using the shallow mode improves the evaluation of outermost pipes when using the deep mode.

The presently described pipe inspection tools may also provide a signal that is sensitive to the defects on the pipe (i.e., the subtraction of the upper and lower coil antennas), where the sum of the signals of upper and lower coil antennas in the pipe inspection tool is highly sensitive to presence of defects next to the center of the tool. As will be appreciated, evaluating the flawed regions in the pipes with higher accuracy facilitates convenient approaches for later remedial treatments.

Figure 1:
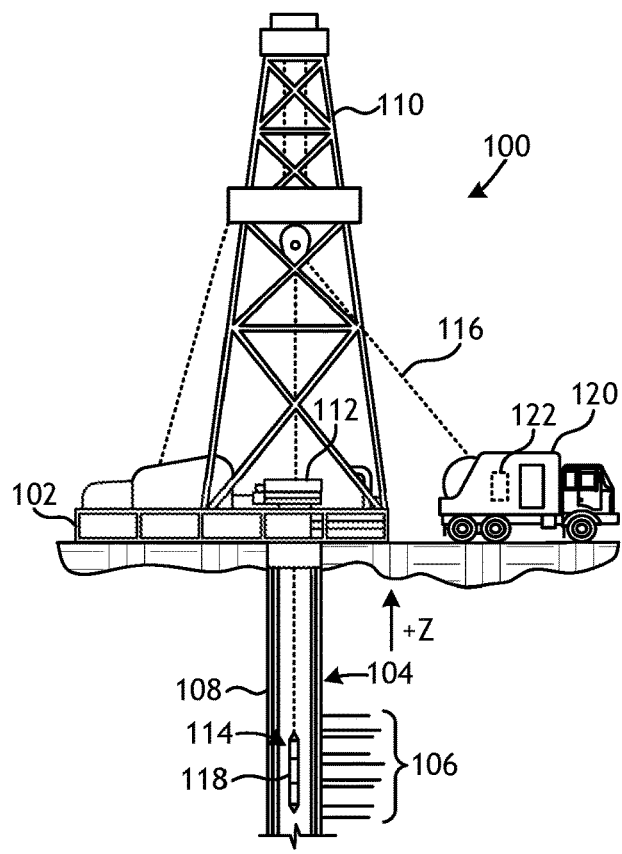
FIG. 1 is a schematic diagram of an exemplary wireline system that may employ the principles of the present disclosure.

FIG. 1 is a schematic diagram of an exemplary wireline system 100 that may employ the principles of the present disclosure, according to one or more embodiments. As illustrated, the wireline system 100 may include a surface platform 102 positioned at the earth's surface and a wellbore 104 that extends from the surface platform 102 into one or more subterranean formations 106. In other embodiments, such as in offshore operations, a volume of water may separate the surface platform 102 and the wellbore 104. The wellbore 104 may be lined with one or more pipes 108, also referred to as strings of casing. In some embodiments, portions of the wellbore 104 may have only one pipe 108 positioned therein, but other portions of the wellbore 104 may be lined with two or more concentrically-disposed pipes 108. The pipes 108 may be made of plain carbon steel, stainless steel, or another material capable of withstanding a variety of forces, such as collapse, burst, and tensile failure.

The wireline system 100 may include a derrick 110 supported by the surface platform 102 and a wellhead installation 112 positioned at the top of the wellbore 104. A pipe inspection tool 114 may be suspended into the wellbore 104 on a cable 116. In some embodiments, the pipe inspection tool 114 may alternatively be suspended within a production pipe (not shown) positioned within the pipes 108 that line the wellbore 104 (i.e., casing). In such embodiments, the production pipe may be adjacent one or more eccentrically-located production pipes (not shown) that are also positioned within the pipes 108. Accordingly, the pipes 108 may refer to strings of casing that line the wellbore 104 and/or at least one production pipe extended into the wellbore 104.

The electromagnetic pipe inspection tool 114 is a non-destructive inspection tool. Its operation may be based on either the flux-leakage principle or the eddy-current principle, or a combination thereof, and may be insensitive to non-magnetic deposits and is operable irrespective of the nature of the fluid mixture flowing into/out of the wellbore 104. The electromagnetic pipe inspection tool 114 is typically used for the detection of localized damage or defects in a ferromagnetic pipe, such as the pipes 108 or a production pipe positioned within the pipes 108. In operation, the pipes 108 are subjected to a strong primary magnetic field produced by the tool 114 and, due to their ferromagnetic nature, eddy currents will be generated inside the pipes. These eddy currents produce secondary magnetic fields that are measured along with the primary magnetic field with the tool 114. In the presence of discontinuities or defects in the metal, such as pits and holes caused by corrosion, the changes in the secondary magnetic field can be detected with the pipe inspection tool 114.

To accomplish this, the pipe inspection tool 114 may include one or more electromagnetic sensors 118, which may be communicably coupled to the cable 116. The cable 116 may include conductors for conveying power to the pipe inspection tool 114 and also facilitate communication between the surface platform 102 and the pipe inspection tool 114. A logging facility 120, shown in FIG. 1 as a truck, may collect measurements from the electromagnetic sensors 118, and may include computing facilities 122 for controlling, processing, storing, and/or visualizing the measurements gathered by the electromagnetic sensors 118. The computing facilities 122 may be communicably coupled to the pipe inspection tool 114 by way of the cable 116.

The electromagnetic sensors 118 may include one or more electromagnetic coil antennas that may be used as transmitters, receivers, or a combination of both (i.e., transceivers) for obtaining in situ measurements of the pipe(s) 108 and thereby determining the structural integrity or condition of each pipe 108. In some embodiments, the electromagnetic sensors 118 may be designed to operate in a centralized position within the innermost pipe 108, such as through the use of one or more centralizers (not shown) attached to the body of the pipe inspection tool 114. In other embodiments, however, the electromagnetic sensors 118 may be designed to be in intimate contact with the inner wall of the innermost pipe 108. In such embodiments, the electromagnetic sensors 118 may be mounted on one or more deployable sensor pads (not shown) positioned on actuatable arms (not shown) that move the electromagnetic sensors 118 radially outward and into engagement with the inner wall of the innermost pipe 108.

Figure 2:
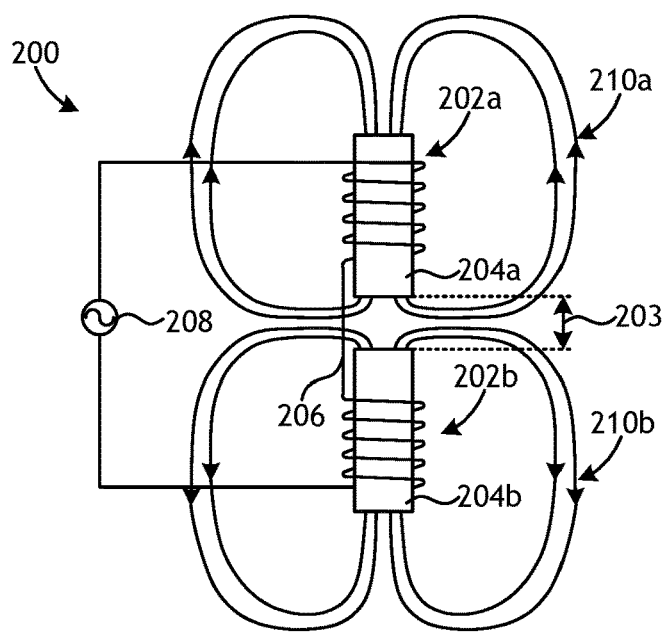
FIG. 2 is a schematic diagram of an exemplary electromagnetic sensor.

Referring now to FIG. 2, illustrated is a schematic diagram of an exemplary electromagnetic sensor 200, according to one or more embodiments of the disclosure. The electromagnetic sensor 200 may be the same as or similar to the electromagnetic sensor 118 of FIG. 1, and therefore may be used in the pipe inspection tool 114 (FIG. 1) to monitor the pipes 108 (FIG. 1) that line the wellbore 104 (FIG. 1) and/or production pipes positioned within the pipes 108 for corrosion or defects. As illustrated, the electromagnetic sensor 200 may include a first coil antenna 202a and a second coil antenna 202b axially offset from the first coil antenna 202a such that an air gap 203 is provided therebetween.

Each coil antenna 202a,b may include a core 204, shown as a first core 204a associated with the first coil antenna 202a and a second core 204b associated with the second coil antenna 202b. Each core 204a,b may be made of a magnetically-permeable material. In the illustrated embodiment, the coil antennas 202a,b may be coupled in series with a wire 206 that is wrapped about each core 204a,b and the wire may be coupled to a coupled power source 208 (e.g., an alternating current). The wire 206 is wrapped about each core 204a,b in opposite orientations or directions such that, when excited by the power source 208, the first coil antenna 202a generates a first magnetic field 210a and the second coil antenna 202b generates a second magnetic field 210b, where the first and second magnetic fields 210a,b comprise opposite polar orientations. The two coil antennas 202a,b may also be wired separately with independent excitation sources 208 synchronized to achieve a desired phase relation between the magnetic fields 210a,b generated by the two coil antennas 202a,b. This second way of connecting allows for both in phase and opposite phase relation or any other desired phase in between these two cases.

As illustrated in FIG. 2, when the two coil antennas 202a,b have opposite polarity, the magnetic fields 210a,b become compressed in a disk-like volume at or near the air gap 203 by the presence of the axially-offset coil antennas 202a,b with opposite orientations. The axial length of each coil antenna 202a,b and the distance between them may dictate how far away (radially) from the pipe inspection tool 114 (FIG. 1) a fraction of the magnetic field lines 210a remain radially oriented.

The receivers for the pipe inspection tool 114 (FIG. 1) may be placed at different positions depending on the desired configuration. When operating in continuous wave at a single or multiple frequencies (i.e., frequency domain), it may be advantageous to position the receiver(s) and transmitter(s) at different positions to reduce direct coupling, i.e., the signal that goes directly from the transmitter(s) to the receiver(s). Frequency domain designs often include cancellation of direct signals, although in pipe inspection the cancellation is not as crucial because the signal from the pipes is very strong. When operating in the time domain, however, the receiver(s) and the transmitter(s) can be generally located at the same axial position on the pipe inspection tool 114.

Figure 3A:
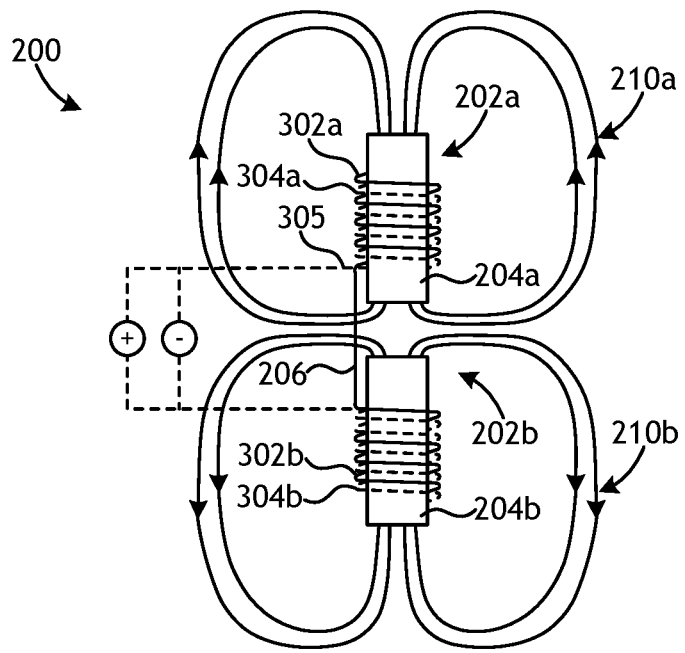
FIG. 3A depicts the electromagnetic sensor of FIG. 2 as including two receiver coils collocated with a corresponding two transmitters.

In FIG. 3A, for example, the electromagnetic sensor 200 of FIG. 2 is shown including two receiver coils collocated or otherwise concentric with a corresponding two transmitter coils, according to one or more embodiments. More particularly, the wire 206 may form a first transmitter coil 302a associated with the first coil antenna 202a and a second transmitter coil 302b associated with the second coil antenna 202b. Moreover, a second wire 305 may be wrapped about the first core 204a to form a first receiver coil 304a collocated with the first transmitter coil 302a, and also wrapped about the second core 204b to form a second receiver coil 304b collocated with the second transmitter coil 302b. Accordingly, the electromagnetic sensor 200 illustrated in FIG. 3A may comprise a time-domain design with collocated transmitters 302a,b and receiver 304a,b. In the various embodiments described herein, and when not explicitly indicated otherwise, the transmitter(s) and receiver(s) are arranged in a collocated configuration, as shown in FIG. 3A, even if only one antenna coil is shown in the corresponding figure(s).

In some embodiments, the transmitters 302a,b and the receivers 304a,b may exhibit different radii. By properly combining these measurements, such as by taking the sum and the subtraction of the induced voltages (indicated by the circles with '+' and '−' signs) in the first and second receiver coils 304a,b together with applying proper spatial transformation that takes into account the axial spacing between the first and second coil antennas 202a,b, the signal-to-noise ratio (SNR) of the electromagnetic sensor 200 can be improved and capabilities for detecting various types of defects can be implemented.

In a symmetric scenario or design, when the section of pipes 108 (FIG. 1) above and below the center of the pipe inspection tool 114 (FIG. 1) are symmetric with respect to the center of the pipe inspection tool 114, and the upper and lower coil antennas 201a,b have substantially same radii and/or dimensions, the signal produced at the first and second receiver coils 304a,b should be the same. If improved symmetry is desired in the field pattern, then the coil antennas 202a,b can be wired separately and a control (not shown) can be used to adjust a small magnitude difference or phase difference between the two coil antennas 202a,b to achieve a more precise symmetry. Accordingly, subtraction of the two induced voltages will cancel identically to a good approximation. Defects in the pipes 108, however, are generally non-symmetric and the signals produced at the first and second receiver coils 304a,b may be generated mostly by the defects of the pipes 108, which indicates a departure from symmetry. In addition, by measuring both receiver coils 304a,b independently, such as via a standard measurement, the typical patterns produced by defects at the upper and lower receiver coils 304a,b may be obtained as the pipe inspection tool 114 moves through the well.

The illuminating field is maximum on a plane crossing the center of the pipe inspection tool 114 (FIG. 1) leading to larger responses for the defects located along this plane. An important aspect of the symmetric design is that the response measured by the symmetric receiver coils 304a,b to defects close to the center of the pipe inspection tool 114, where the magnetic field 210a,b is a maximum, affects both receiver coils 304a,b in the same way. That is, the effect will be accounted for in the sum of the signals measured by the two receiver coils 304a,b. A defect in the pipes 108 (FIG. 1), however, changes the magnetic reluctance (resistance) encountered by the magnetic fields 210a,b. The effect on both receiver coils 304a,b is the same when the defect is located in the middle between the receiver coils 304a,b. Accordingly, in addition to the double measurement of the standard design, the electromagnetic sensor 200 of FIG. 3A may prove advantageous in providing a signal sensitive to the defects (i.e., subtraction of two receiver coils 304a,b) and a signal sensitive to defects with high resolution at the center of the pipe inspection tool 114 (i.e., sum of both receiver coils 304a,b).

Figure 3B:
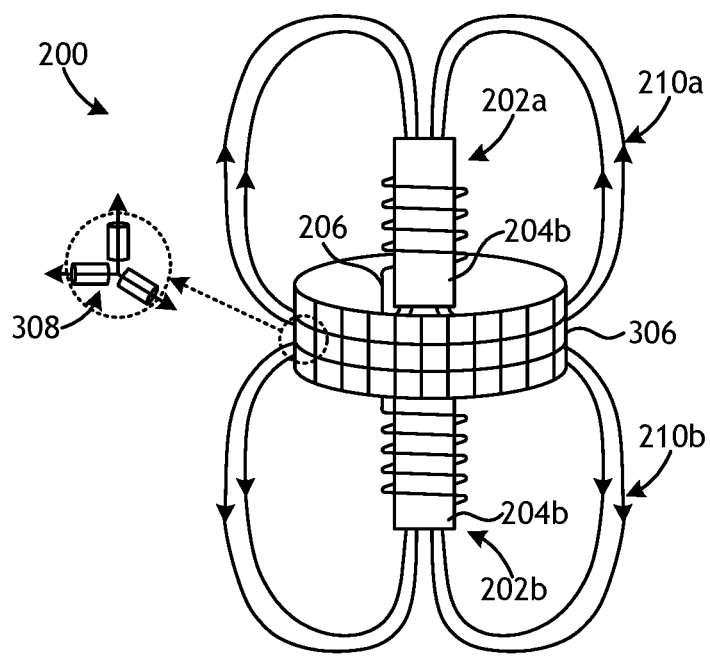
FIG. 3B depicts another embodiment of the electromagnetic sensor of FIG. 2.

FIG. 3B depicts another embodiment of the electromagnetic sensor 200 of FIG. 2. As illustrated, the electromagnetic sensor 200 may include a receiver grid 306 configured to support and otherwise house a plurality of receiver coils 308 that spread along azimuthal and axial directions with respect to the first and second coil antennas 202a,b. The spread along the azimuthal direction can provide azimuthal resolution. In some embodiments, the radial position of the receiver grid 306 may be radially adjacent to the first and second coil antennas 202a,b. In other embodiments, however, the radial position of the receiver grid 306 may be close to the inner surface of an innermost pipe 108 (FIG. 1). In such embodiments, the receiver grid 306 may be supported on a plurality of deployable sensor pads (not shown) positioned on actuatable arms (not shown) that move the receiver coils 308 radially outward and into engagement with the inner wall of the innermost pipe 108.

In some embodiments, each cell in the receiver grid 306 may contain a receiver coil 308. In other embodiments, receiver coils 308 may be selectively located in some but not all of the cells of the receiver grid 306 about the azimuth. Some or all of the receiver coils 308 may be tri-axial or multi-component coils capable of sensing various components (i.e., directions) of the magnetic fields 210a,b.

The receiver coils 308 can be also employed to sense the focusing property of the pipe inspection tool 114 (FIG. 1) and provide feedback to the electronics section for controlling the excitation current in the wire 206 for the first and second coil antennas 202a,b, when wired separately. As will be appreciated, this may improve the focusing of the magnetic field 210a,b of the pipe inspection tool 114 in real-time. In such cases, control of the currents of the coil antennas 202a,b to achieve focusing of the magnetic field 210a,b could be performed for each azimuth position on the receiver grid 306. The condition for optimal focusing may be achieved when the magnetic field 210a,b is maximum at the axial middle of the three-sensor receiver grid 306. By finding the transmitter currents that produce a zero derivative at the center of the receiver grid 306, the focusing condition can be achieved.

According to one or more embodiments, multi-mode operation can be implemented by employing multiple pairs of coil antennas with variable length and/or spacing between them. These pairs of coil antennas with variable length, for instance, can be separate coil antennas or can alternatively be made by connecting various numbers of smaller coil antennas in series. For such a tool, shallow modes are employed to estimate the innermost pipes while deep modes are employed to evaluate the outer-most pipes. Evaluation of the innermost pipes using the shallow modes leads to better evaluation of the outer-most pipes when employing the deep mode responses. The best characterization of a configuration with multiple pipes would be one with several modes, which are sensitive in different ways to the pipes at multiple radial distances. In the case of operation as separate coil antennas, by synchronizing the sources of each desired phase and magnitude relations between the different coil antennas can be achieved.

Figure 4A:
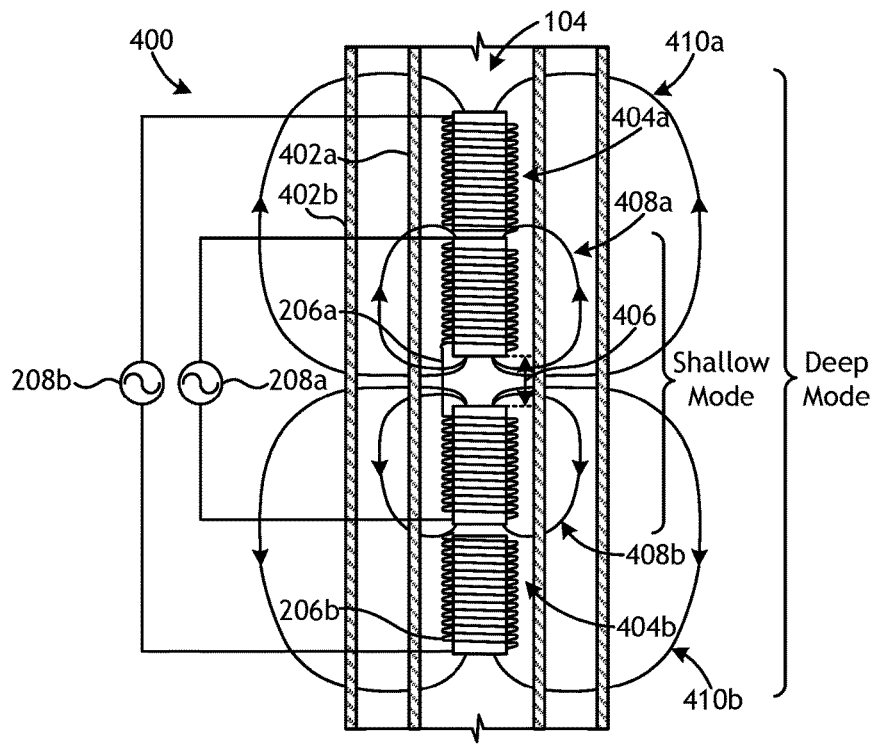
FIG. 4A is a schematic diagram of an exemplary electromagnetic sensor that exhibits at least two modes of operation.

Referring now to FIG. 4, illustrated is a schematic diagram of another exemplary electromagnetic sensor 400 that may exhibit at least two modes of operation, according to one or more embodiments of the disclosure. Similar to the electromagnetic sensor 118 of FIG. 1, the electromagnetic sensor 400 may be used in the pipe inspection tool 114 (FIG. 1) to monitor one or more wellbore pipes 402 (shown as a first pipe 402a and a second pipe 402b) positioned within the wellbore 104 for corrosion or defects. In some embodiments, the first and second pipes 402a,b may be similar to the concentrically-positioned pipes 108 of FIG. 1 and therefore line the walls of the wellbore 104. In other embodiments, however, the first pipe 402a may comprise a production pipe concentrically- or eccentrically-positioned within the second pipe 402b, which may comprise a pipe that lines the wellbore 104, without departing from the scope of the disclosure.

As illustrated, the electromagnetic sensor 400 may include an upper pair of coil antennas 404a and a lower pair of coil antennas 404b axially offset from the upper pair of coil antennas 404a such that an air gap 406 is provided therebetween. Each coil antenna of the upper and lower pairs of coil antennas 404a,b may be similar in some respects to the first and second coil antennas 202a,b of FIG. 2, and may be referred to herein as transmitter coils. More particularly, each coil antenna of the upper and lower pairs of coil antennas 404a,b may include a core (i.e., cores 204a,b of FIG. 2) and a wire 206 may be wrapped about each core. More particularly, a first wire 206a may be wrapped about the cores of the innermost two coil antennas of the upper and lower pairs of coil antennas 404a,b to connect them in series, and a second wire 206b may be wrapped about the cores of the outermost two coil antennas of the upper and lower pairs of coil antennas 404a,b to connect them in series.

The wires 206a,b wrapped about the cores of the upper pair of coil antennas 404a may be wrapped in a first direction while the wires 206a,b wrapped about the cores of the lower pair of coil antennas 404b may be wrapped in a second direction opposite the first direction. As a result, the upper pair of coil antennas 404a may cooperatively operate as a first elongated transmitter coil, and the lower pair of coil antennas 404b may cooperatively operate as a second elongated transmitter coil, and the innermost two coil antennas of the upper and lower pairs of coil antennas 404a,b may each operate as a short transmitter coil. Again, when wired separately, the excitation phase can be controlled to achieve in-phase or opposite-phase relation between axially adjacent coil antennas.

When the innermost two coil antennas of the upper and lower pairs of coil antennas 404a,b are excited by a first power source 208a (e.g., an alternating current), the current flowing in the first wire 206a produces a first shallow magnetic field 408a and a second shallow magnetic field 408b, where the first and second shallow magnetic fields 406a,b comprise opposite polar orientations. Moreover, when the outermost two coil antennas of the upper and lower pairs of coil antennas 404a,b are excited with a second power source 208b (e.g., an alternating current), the current flowing in the second wire 206b produces a first deep magnetic field 410a and a second deep magnetic field 410b, where the first and second deep magnetic fields 410a,b comprise opposite polar orientations. In a preferred implementation, the antennas are wired separately and the control of the excitation determines the relative polarity of the coil antennas. In such embodiments, the excitation for low frequencies could have both upper and both lower coil antennas in phase with opposite phases between them for the deep mode and in the shallow mode a higher frequency is used with all adjacent coil antennas having opposite phases. Controlling the excitation in this way can achieve different field patterns for different frequencies intended to measure shallow or deep defects in the pipes.

It should be noted that the air gap 406 needs to be sufficiently large to allow the shallow and deep magnetic fields 408a,b and 410a,b to escape through the center to allow sensing. Optimal size of the air gap 406 depends on the geometry of the coil antennas and the magnetic permeability of the cores used. In some embodiments, for instance the axial length of the air gap 406 could be anywhere between ⅛th of the coil diameter and ten times the coil diameter. In at least embodiment, the air gap 406 is two times the coil diameter.

As illustrated, the shallow and deep magnetic fields 408a,b and 410a,b become compressed in a disk-like volume at or near the air gap 406 by the presence of the upper and lower pairs of coil antennas 404a,b with opposite orientations. Accordingly, the electromagnetic sensor 400 may be configured with two modes of operation: deep mode and shallow mode. The double depth of focus is achieved by using two different lengths of the coil antennas included in the electromagnetic sensor 400. The shallow and deep magnetic fields 408a,b and 410a,b produced by the upper and lower pairs of coil antennas 404a,b may be drastically distorted by the presence of the pipes 402a,b (distortion not shown in FIG. 4A).

Figure 4B:
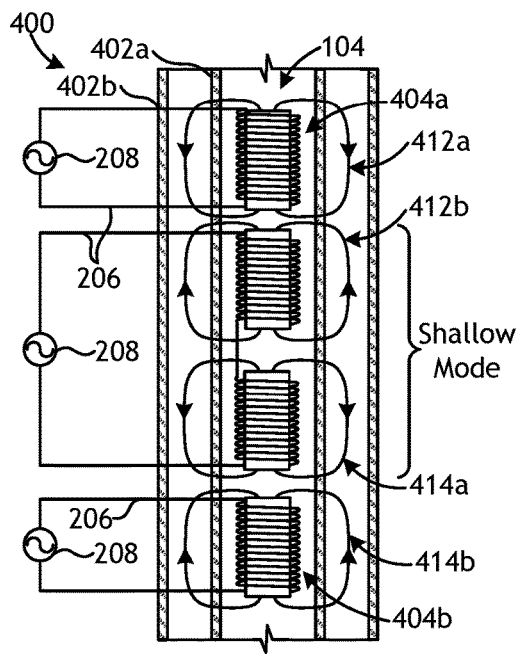
FIG. 4B is a schematic diagram of another embodiment of the electromagnetic sensor of FIG. 4A.

In FIG. 4B, another embodiment of the electromagnetic sensor 400 is depicted showing coil antennas with shorter lengths. More particularly, the pair of upper coil antennas 404a may each be wrapped with wire 206 in opposite directions, and generating upper shallow magnetic fields 412a and 412b that exhibit opposite orientations when excited by corresponding power sources 208. Similarly, the pair of lower coil antennas 404b may each be wrapped with wire 206 in opposite directions, and generating lower shallow magnetic fields 414a and 414b that exhibit opposite orientations when excited by corresponding power sources 208. Accordingly, the resulting magnetic fields 412a,b and 414a,b may be focused at shallower positions for inspecting the first pipe 402a. In such embodiments, the same position of the inner pipe 402a may be measured several times while the pipe inspection tool 114 (FIG. 1) logs, thereby adding redundancy to the measurement to improve the signal-to-noise ratio and pipe evaluation results.

The coil antennas of each pair of upper and lower coil antennas 404a,b may be selectively excited such that the orientation of the resulting magnetic fields 412a,b and 414a,b improves the focusing property of the pipe inspection tool 114 (FIG. 1). This is achieved by controlling the excitation of each coil antenna to achieve a desired phase relation for each of them.

Figure 4C:
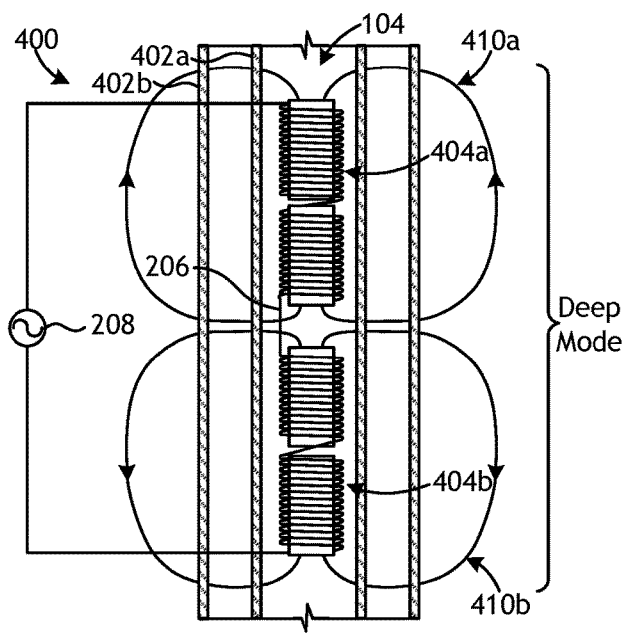
FIG. 4C is a schematic diagram of another embodiment of the electromagnetic sensor of FIG. 4A.

In FIG. 4C, another embodiment of the electromagnetic sensor 400 is depicted showing the upper and lower pairs of coil antennas 404a,b connected in series with the wire 206. As a result, the upper pair of coil antennas 404a may cooperatively operate as a first elongated transmitter coil, and the lower pair of coil antennas 404b may cooperatively operate as a second elongated transmitter coil. The wire 206 may be wrapped around the upper pair of coil antennas 404a in a first direction and wrapped around the lower pair of coil antennas 404b in a second direction opposite the first direction. Accordingly, when the upper and lower pairs of coil antennas 404a,b are excited using the power source 208, the first and second deep magnetic fields 410a,b comprising opposite polar orientations are generated. The first and second deep magnetic fields 410a,b are focused at deeper radial positions due to the equivalent larger (longer) coil antenna sizes. As will be appreciated, the embodiment of FIG. 4C may prove advantageous in inspecting the second pipe 402b, while maintaining good resolution due to the focusing property of the pipe inspection tool 114 (FIG. 1). As mentioned above, any of these field patterns can be achieved by winding coil antennas separately and controlling phase and magnitude of each coil antenna.

FIGS. 5A and 5B are schematic diagrams of another exemplary electromagnetic sensor 500, according to one or more embodiments. As illustrated, the electromagnetic sensor 500 may include a first coil antenna 502a and a second coil antenna 502b axially offset from the first coil antenna 502a. Each coil antenna 502a,b may share a common core 504, which provides a reduced diameter region 506 that interposes the first and second coil antennas 502a,b. Similar to the cores 204a,b of FIG. 2, the core 504 may be made of a magnetically-permeable material. The first coil antenna 502a may include a first wire 206a wrapped about the upper portion of the core 504 and communicably coupled to a first power source 208a. Similarly, the second coil antenna 502b may include a second wire 206b wrapped about the lower portion of the core 504 and communicably coupled to a second power source 208b. In FIG. 5A, currents in 206a and 206b are in opposite directions, while the same currents in FIG. 5B are in the same direction which produces two modes the first of which is shallow and high resolution, and the second of which is deep. The opposing or same polarity of the currents may be achieved by either adjusting the winding directions and connecting the first and second coil antennas 502a,b in series to a common power source, or by connecting the top and the first and second coil antennas 502a,b to different power sources and adjusting the phase of current in each coil antenna 502a,b separately, as mentioned above.

In FIG. 5A, for example, the first and second power sources 208a,b are operated in opposite phases, thereby resulting in a first magnetic field 508a produced by the first coil antenna 504a and a second magnetic field 508b produced by the second coil antenna 504b, where the first and second magnetic fields 508a,b comprise opposite polar orientations. As used herein, "opposite phase" refers to a phase difference substantially equal to 180°. In FIG. 5B, the first and second power sources 208a,b are operated in equal phases, thereby converting the electromagnetic sensor 500 into an elongated coil antenna capable of emitting a larger magnetic field 510 as compared to the first and second magnetic fields 508a,b. As used herein, "equal phase" refers to a phase difference substantially equal to 0°. The precise current to achieve optimal focusing can be adjusted and optimized by controlling the current outputted by the first and second power sources 208a,b.

The reduced diameter region 506 of the core 504 may prove advantageous in providing a more stable magnetic field pattern between the first and second coil antennas 502a,b. More particularly, the reduced diameter region 506 provides a location where the flux of the first and second magnetic fields 508a,b is able to break from the first and second coil antennas 502a,b, as depicted in FIG. 5A. Moreover, by sharing a common core 504, the electromagnetic sensor 500 can be mechanically more stable, so that the symmetry between the first and second coil antennas 502a,b (which is important for the generation of the focused magnetic field) can be more precise.

The reduced diameter region 506 of the core 504 also helps achieve various different modes of operation with multiple depths of investigation that are collocated and use a number of coil antennas whose currents are controlled to achieve the required focusing conditions of each mode. By sharing a common core 504 with the reduced diameter region 506 therebetween, the magnetic resistance between axially adjacent coil antennas may be lowered. Moreover, the receiver grid 306 (FIG. 2) may be used to monitor the focusing of the resulting magnetic fields at any interface between axially adjacent coil antennas and thereby provide the required feedback to achieve the desired focusing condition.

In some embodiments, however, it may be advantageous to eliminate the core 504 so that a receiver with a null direct field can be placed at that location. The receiver grid 306 FIG. 2, for example, may be positioned at the center of the electromagnetic sensor 500 and used to give feedback to the first and second power sources 208a,b to control the current and thereby improve the focusing of the magnetic fields and also provide a zero direct field receiver for analysis of early time signals in the time domain application.

By using this configuration, a symmetric electromagnetic sensor with a single core on the upper side of the electromagnetic sensor (which may have different diameter in the sections between coil antennas) and another identical core on the lower side with a space between the two cores at the center of the electromagnetic sensor would be able to support multiple modes with different focusing depths. The number of operational modes would depend on the number of coil antennas placed on each side of the center of the electromagnetic sensor.

More specifically, and with reference to FIGS. 6A, 6B, and 6C, illustrated are schematic views of three embodiments of another exemplary electromagnetic sensor 600 showing three distinct modes of operation, according to the present disclosure. The electromagnetic sensor 600 may include an upper portion 602a and a lower portion 602b, and each portion 602a may include four transmitter coils, but could alternatively include more or less than four transmitter coils, without departing from the scope of the disclosure. The transmitter coils in the upper portion 602a may each share a common core 604a and the transmitter coils in the lower portion 602b may also each share a common core 604b, and the upper and lower portions 602a,b may be axially offset from each other and otherwise separated by an air gap 606.

Each coil antenna in the upper and lower portions 602a,b in at least one embodiment may be wired independently and coupled to an independent power source (not shown), which may be able to adjust the current of the excitation to achieve a desired focusing condition. In some embodiments, the receiver grid 306 of FIG. 2 (not shown in figures) may be positioned at the center of the electromagnetic sensor 600 or otherwise at the location of the air gap 606 to measure the magnetic field to provide feedback for the focusing control. Measurements can be taken at each of the collocated receivers (not shown) and at the center of the electromagnetic sensor 600 by placing the receiver grid 306 at that location.

FIG. 7 illustrates a schematic diagram of another exemplary electromagnetic sensor 700, according to one or more embodiments. As illustrated, the electromagnetic sensor 700 may include multiple transmitter coils 702 (shown as transmitter coils 702a, 702b, 702c, and 702d) independently powered by corresponding power sources 208a, 208b, 208c, and 208d, respectively. The electromagnetic sensor 700 may be used in the pipe inspection tool 114 (FIG. 1) to monitor one or more wellbore pipes 704 (shown as a first pipe 704a and a second pipe 704b) positioned within the wellbore 104 for corrosion or defects. In some embodiments, the first and second pipes 704a,b may be similar to the concentrically-positioned pipes 108 of FIG. 1 and therefore line the walls of the wellbore 104. In other embodiments, however, the first pipe 704a may comprise a production pipe concentrically- or eccentrically-positioned within the second pipe 704b that lines the wellbore 104, without departing from the scope of the disclosure.

The transmitter coils 702a-d may be designed and otherwise configured to perform focusing at various radial depths when they are excited individually or in series. In some embodiments, a receiver grid 706 may be positioned between axially adjacent transmitter coils 702a-d. Accordingly, the electromagnetic sensor 700 may be depicted as a time-domain inspection tool. In other embodiments, however, the electromagnetic sensor 700 may include one or more collocated receiver coils, similar to the receiver coils 304a,b of FIG. 3A, or separate receiver coils, the latter being advantageous for frequency-domain operation.

The receiver grid 706 may be similar to the receiver grid 306 of FIG. 3B and, therefore, will not be described again in detail. As illustrated, separate receiver grids 706 may interpose the first and second transmitter coils 702a,b, the second and third transmitter coils 702b,c, and the third and fourth transmitter coils 702c,d. The receiver grids 706 may be configured to sense the magnetic fields generated by the transmitter coils 702a-d and provide feedback to a data acquisition and control unit 708, which may be communicably coupled to the power sources 208a-d. In response to the signals provided by the receiver grids 706, the data acquisition and control unit 708 may be configured to control the excitation currents produced by the power sources 208a-d for the individual transmitter coils 702a-c to ensure that the electromagnetic sensor 700 reaches the optimum focusing performance.

The electromagnetic sensor 700 may be configured to operate in continuous wave with a different frequency for each mode. In such cases, a receiver (e.g., the center receiver grid 706) placed at the center of the electromagnetic sensor 700 with direct signal cancelled because of the opposing magnetic fields may be optimal. The deeper modes can have lower frequency of operation to be able to reach deeper into the multiple-pipe 704a,b configuration. The frequencies of operation for the electromagnetic sensor 700, for example, can be below 1000 Hz for the shallow mode and below 100 Hz for the deep mode. As will be appreciated, the lower the frequency, the larger the skin depth associated with the metal of the pipes 704a,b, so the electromagnetic energy can reach deeper.

For operation in the time-domain, the transmitter coils 702a-d may be configured to operate in phase or in opposite phases as a first approximation to achieve the focusing condition. Small imperfections in the symmetry of the configuration can be balanced by controlling the power sources 208a-d with the data acquisition and control unit 708 for each coil antenna 702a-d above and below the center of the electromagnetic sensor 700. If the symmetry of the configuration is sufficiently precise, the receiver grids 706 can operate to measure the resulting magnetic fields azimuthally, since in such cases feedback for focusing may not be necessary.

FIGS. 8A and 8B schematically depict the typical current flow patterns generated in wellbore pipes. More particularly, FIG. 8A depicts the current flow in a pipe symmetric with respect to the center of an electromagnetic sensor, and FIG. 8B depicts the effective current pattern in the presence of a defect. The views in FIGS. 8A and 8B are radially looking into the pipe toward the longitudinal axis (i.e., the "Tool axis") of the electromagnetic sensor. The currents 802 are represented by the arrows and the magnetic fields 804 are perpendicular to views of FIGS. 8A and 8B and otherwise coming out of the paper. In the symmetric case of FIG. 8A, all the circles that represent current 802 are identical and the current portions going up and down with respect to the Tool axis cancel identically. Accordingly, in FIG. 8A, the effective current 806 is represented by two straight lines. In FIG. 8B, the effective current 806 is represented by two straight lines and a circle.

The effective current 806 flow pattern in a symmetric pipe is perpendicular to the axis of the pipe along the azimuthal direction, as indicated in FIG. 8A. Right next to the center of the electromagnetic sensor, the current cancels because it goes from flowing in one direction to flowing in the opposite direction. However, when a defect 808 is present, as shown in FIG. 8B, the cancellation of the vertical currents is not complete and vertical currents are present right next to the center of the electromagnetic sensor. This is the typical signature of a localized defect (i.e., corrosion) next to the center of the electromagnetic sensor.

Designs convenient for frequency-domain, as mentioned above, may include cancellation of a direct signal. The receiver at the center (i.e., between two transmitter coils that generate opposing fields) can be used in frequency-domain operation because the direct signal can be cancelled by proper balance of the currents supplied to the transmitter coils.

Figure 9:
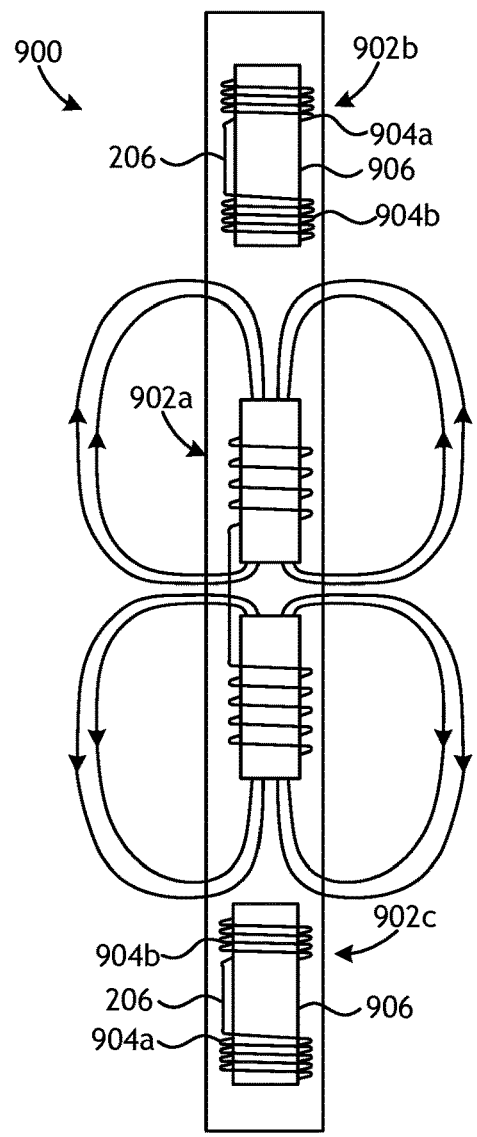
FIG. 9 is a schematic diagram of another exemplary electromagnetic sensor.

FIG. 9 is a schematic diagram of another exemplary electromagnetic sensor 900 that includes a set of three balanced coil antennas, according to one or more embodiments. More particularly, the electromagnetic sensor 900 includes a first coil antenna 902a generally located at the center of the electromagnetic sensor 900, a second or upper coil antenna 902b located axially above the first coil antenna 902a, and a third or lower coil antenna 902c located axially below the first coil antenna 902a. The first coil antenna 902a may be substantially similar to the embodiment described herein with respect to FIG. 2, and therefore will not be described again in detail. The second and third coil antennas 902b,c may be symmetrically placed with respect to the center of the electromagnetic sensor 900.

Each of the second and third coil antennas 902b,c may include a main coil 904a and a bucking coil 904b axially offset from the main coil 904a. Moreover, the second and third coil antennas 902b,c may each include a core 906, similar to the cores 204a,b of FIG. 2. In some embodiments, the core 906 for one or both of the second and third coil antennas 902b,c may comprise a monolithic structure, as illustrated. In other embodiments, however, the core 906 may be separated at a gap (not shown), and thereby separating the main and bucking coils 904a,b via the gap. The core 906 may be made of a magnetically-permeable material whose properties remain stable over large temperature and pressure ranges to achieve stable signal cancellation in diverse downhole environments.

The main and bucking coils 904a,b of each of the second and third coil antennas 902b,c may be connected in series with a wire 206. The wire 206 is wound about the core 906 in a first direction for the main coil 904a and wound about the core 906 in a second direction opposite the first direction for the bucking coil 904b. The position and number of winding turns of the main and bucking coils 904a,b may be selected to achieve cancellation of a direct signal. Accordingly, in exemplary operation, the main and bucking coils 904a,b may be configured to cancel direct signals. Cancellation of direction signals in the embodiment of FIG. 9 is important to maximize the percentage signal that is coming from the defects compared to signals that are coming from the pipes. This can improve the accuracy of the defect measurement and allow detection of smaller defects.

Figure 10:
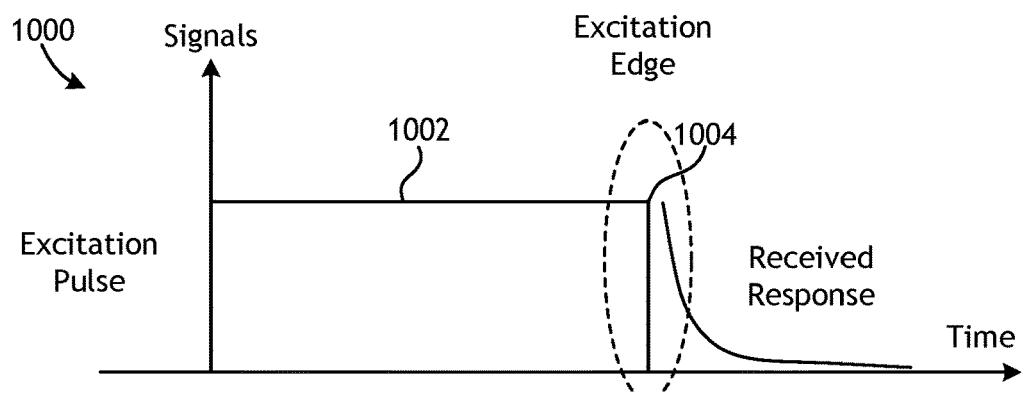
FIG. 10 is a plot that graphically depicts excitation in the time-domain.

FIG. 10 is a plot 1000 that graphically depicts excitation in the time-domain. As illustrated, a pulse current applied to one or more transmitters generates a static magnetic field distribution, as shown as 1002. When the current is turned off, as at 1004, the receiver(s) register the signals. As will be appreciated, the pulses of the transmitters can be balanced to generate the focused magnetic field distribution at the center of an electromagnetic sensor, which can be achieved with current control and feedback. Typical duration of the static portion of the excitation signal, 1002, is between 50 to 2000 milliseconds. Typical duration of the decay response, 1004, listening time is between 50 to 2000 milliseconds. Typical duration between each pulse (combination of 1002 and 1004) is 100 milliseconds to 4000 milliseconds. In a time-domain system, a digital sampling system is used to obtain time samples of signal with a sampling frequency which is typically in the order of 10-10000 Hertz. In order to reduce the noise and data that will be used in processing, average signal in certain time intervals can be used instead of using each time sample individually. There is a duality between a time-domain and frequency-domain system: early time response of the decay is strongly correlated with high frequency response, while late time response of the decay is strongly correlated with the low frequency response.

In the frequency-domain, the operation can be in continuous waves with a set of frequencies operating simultaneously. Different frequencies have different skin depth, and a sufficient variation of frequencies can be selected to gather measurements at different radial depths away from an electromagnetic sensor within a multiple-pipe configuration. Similarly, different time intervals can be selected to gather measurements at different radial depths.

Figure 11:
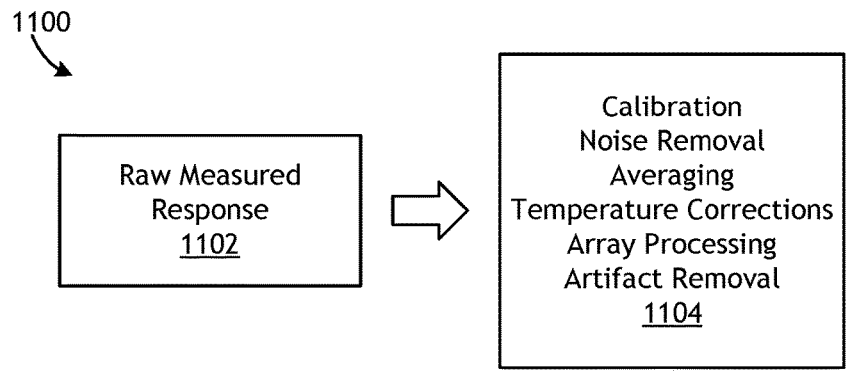
FIG. 11 is a schematic diagram of a method of processing measurement data received from the pipe inspection tool of FIG. 1.

FIG. 11 illustrates a schematic diagram 1100 of processing measurement data 1102 received from the pipe inspection tool 114 of FIG. 1, according to one or more embodiments. More particularly, the measurement data 1102 may be obtained from the pipe inspection tool 114 as incorporating any of the electromagnetic sensors described herein and any of their various embodiments. Some of the processing operations 1104 that can be applied to the acquired raw responses of the measurement data 1102 include, but are not limited to, filtering to reduce noise; averaging multiple sensor data to reduce noise; taking the difference or the ratio of multiple voltages to remove unwanted effects (e.g., a common voltage drift due to temperature); temperature correction schemes (e.g., a temperature correction table); calibration to known/expected parameter values from an existing well log; and undertaking array processing (software focusing) of the measurement data 1102 to achieve different depth of detection or vertical/azimuthal resolution. The aforementioned processing operations 1104 are well-known in the field of EM well logging and, therefore, their details are not provided here.

In some embodiments, approaches may be employed to reduce spurious effects of the measurement data 1102. For example, when using an electromagnetic sensor with the receivers collocated or concentric with the transmitters, double peaks may be observed in the response recorded by each receiver when the electromagnetic sensor is scanning in the axial direction. One peak would correspond to the case when the transmitter and the receiver are at the same axial position as the defect, and a much larger peak in the response would correspond to the case where a defect is at the focused zone. With proper artifact removal algorithms, such as de-convolution or filtering, the responses can be processed such that only one peak is observed in the processed response.

Figure 12:
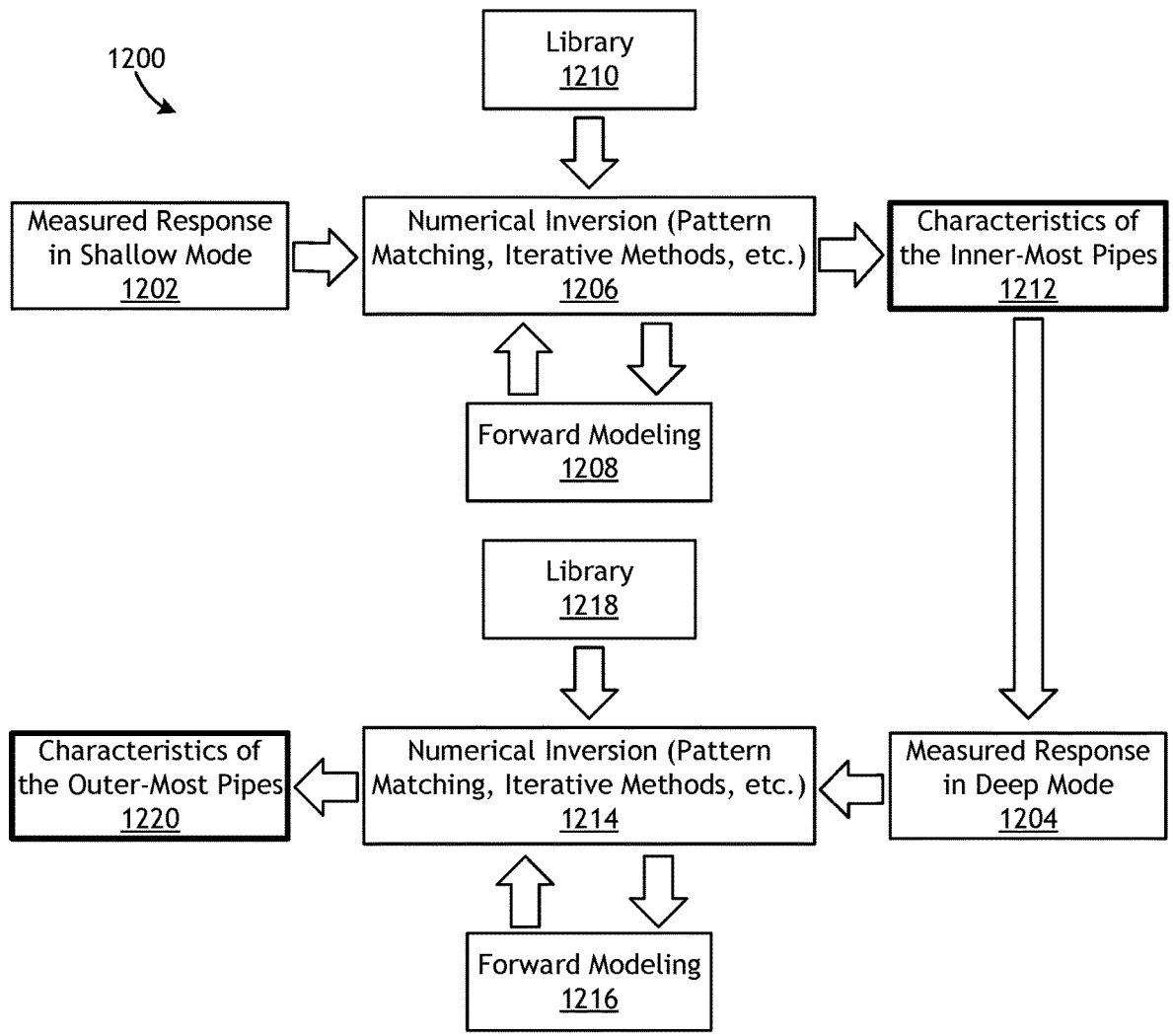
FIG. 12 is a schematic flow chart of an inversion method that may be applied to convert measured responses from an electromagnetic sensor into one or more characteristics of wellbore pipes.

Referring now to FIG. 12, illustrated is a schematic flow chart of an inversion method 1200 that may be applied to convert measured responses from an electromagnetic sensor into one or more characteristics of wellbore pipes. The electromagnetic sensor used in the inversion method 1200 may comprise any of the electromagnetic sensors described herein and may be configured to obtain shallow mode measurement data 1202 and deep mode measurement data 1204. Example characteristics of wellbore pipes that may be determined using the inversion method 1200 include, but are not limited to, the number of wellbore pipes in a wellbore, the dimensions (i.e., diameter, wall thickness, etc.) of the wellbore pipes, the presence of a defect (e.g., corrosion, fractures, holes, and decreased wall thickness) in the wellbore pipes, and/or the presence of a conductive or magnetically-permeable feature in the wellbore pipes.

According to the method 1200, a first numerical inversion operation 1206 may be applied first to obtain shallow mode measurement data 1202. Performing the first numerical inversion operation 1206 may include using forward modelling 1208 and/or a library 1210. Forward modelling 1208 (and 1216 below) provides simulated responses for any given set of pipe configurations or defects and it can be used to determine the thickness of pipes for a given set of signals. Specifically, input to forward modelling 1208, 1216 is the pipe thicknesses, pipe magnetic permeability, pipe conductivity, pipe geometry including any defects, coil geometry (i.e., position, length, radius), core geometry and material. Output to forward modelling 1208, 1216 is simulated receiver signals at the receiver coils. Alternatively, a library 1210 (and 1218 below) may be used to correlate information regarding various wellbore pipe characteristics to measured responses from selected coil antenna signals or measurements of certain transmitted magnetic fields. The library 1210, 1218 may be used in cases where the forward modelling 1208, 1216 is too computationally inefficient. This may include cases with two-dimensional (2D) and three-dimensional (3D) parameterization of the pipes or defects, or cases with very large number of pipes. A 2D parameterization is a geometrical representation of the pipe that is allowed to vary in two dimensions, whereas a 3D parameterization is a geometrical representation of the pipe that is allowed to vary in three dimensions.

The first numerical inversion operation 1206 may entail performing an iterative process and/or undertaking a pattern matching process. In particular, the first numerical inversion 1206 may be performed by iteratively comparing signals of the shallow mode measurement data 1202 with values obtained by the forward modelling 1208 or otherwise stored in the library 1210. In at least one example of iterative use of the forward modelling 1208, an initial value or guess of a characteristic (e.g., the number of wellbore pipes) and a forward model may be applied to the initial value. The forward model provides a response, and the response is compared with a measured value and a next guess is generated based on the comparison. The comparison process continues to adjust the guess until the values of the forward model and the measured results agree.

The library 1210 can be used with a pattern-matching inversion process. The library 1210 may include correspondences between a physical measurement and a property or an identification of the nature of a physical entity (i.e., a wellbore pipe) that generated a particular electromagnetic field in response to a sensor signal. For example, measurement of a specific voltage or field can be mapped to a specific type of wellbore pipe, wellbore pipe dimension, or defect (i.e., corrosion). By comparing the measured value with a library including such values, a characteristic of the wellbore pipe, such as wellbore pipe number, dimension, or a defect can be obtained from the library 1210 by the matching process. In some embodiments, a pattern of measured voltages can be matched to voltages in the library 1210 to identify the desired wellbore pipe characteristic. Outputs from the first numerical inversion 1206 provide characteristics of the innermost wellbore pipes 1212.

The method 1200 may then include applying a second numerical inversion operation 1214 to the obtained deep mode measurement data 1204. Similar to the first numerical inversion operation 1206, the second numerical inversion operation 1214 may include using forward modelling 1216 and/or a library 1218, but applicable to the deep mode measurement data 1204. Outputs from the second numerical inversion 1214 provide characteristics of the outermost wellbore pipes 1220.

Effects due to the presence of the housing for the electromagnetic sensors, a pad structure (if used) that houses the electromagnetic sensors, the mutual coupling between the electromagnetic sensors, mud, and cement can all be corrected by using a priori information on these characteristics 1212, 1220, or by solving for some or all of them during the inversion method 1200. Since all of these effects are mainly additive, they may be removed using proper calibration schemes. The multiplicative (scaling) portion of the effects can also be removed in the process of calibration to an existing log. All additive, multiplicative, and any other non-linear effect can be solved for by including them in the first and second numerical inversion operations 1206, 1214 as a parameter. Removal of such effects is well-known in EM well logging and, therefore, are not described in detail here.

By detecting and estimating the size of smaller defects, predictions that are more accurate can be performed on the useful lifetime of the wellbore pipes or a decision can be made for replacing the flawed sections.

Embodiments disclosed herein include:

A. An electromagnetic sensor for a pipe inspection tool that includes a first coil antenna having a wire wrapped about a first core in a first direction, a second coil antenna axially offset from the first coil and having the wire wrapped about a second core in a second direction, and a power source coupled to the wire, wherein, when excited by the power source, the first coil antenna generates a first magnetic field in a first polar orientation and the second coil antenna generates a second magnetic field in a second polar orientation opposite to the first polar orientation.

B. An electromagnetic sensor for a pipe inspection tool that includes a first pair of transmitter coils that generates a first shallow mode magnetic field in a first polar orientation and a first deep mode magnetic field in the first polar orientation, and a second pair of transmitter coils axially offset from the first pair of transmitter coils to generate a second shallow mode magnetic field in a second polar orientation and a second deep mode magnetic field in the second polar orientation, wherein the second polar orientation is opposite the first polar orientation.

C. An electromagnetic sensor for a pipe inspection tool that includes a plurality of transmitter coils axially spaced from each other and excited independently with controlled magnitude and phase, and a receiver grid arranged between axially-adjacent transmitter coils of the plurality of transmitter coils, the receiver grid being arranged about an azimuthal direction with respect to the axially-adjacent transmitter coils and including a plurality of cells, wherein some or all of the cells includes a receiver coil antenna to sense the first and second plurality of magnetic fields and generate a signal.

Each of embodiments A, B, and C may have one or more of the following additional elements in any combination: Element 1: wherein the first and second cores are axially-offset from each other and an air gap is provided therebetween. Element 2: wherein the first and second cores comprise a monolithic core with a reduced diameter between the first and second coil antennas. Element 3: wherein the wire wrapped about the first core is a first wire, the first coil antenna is a first transmitter coil, the wire wrapped about the second coil antenna is a second wire, and the second coil antenna is a second transmitter coil, and wherein the first and second transmitter coils are excited by separate sources synchronized to produce a fixed phase relation between the first and second transmitter coils. Element 4: where the fixed phase relation is adjustable based on feedback to achieve a desired phase relation between the first and second transmitter coils. Element 5: further comprising a first receiver coil collocated with the first transmitter coil and formed with a third wire wrapped about the first core, and a second receiver coil collocated with the second transmitter coil and formed with the third wire wrapped about the second core. Element 6: wherein a radius of at least one of the first and second transmitter coils is different from a radius of the first and second receiver coil antennas. Element 7: further comprising a receiver grid axially interposing the first and second antenna coils and including a plurality of cells, wherein at least some of the cells of the plurality of cells include a receiver coil that senses the first and second magnetic fields. Element 8: wherein the receiver coils of the receiver grid are spread along an azimuthal direction with respect to the first and second coil antennas. Element 9: wherein a radial position of the receiver grid is adjacent to an inner surface of a wellbore pipe. Element 10: wherein the receiver grid is used in frequency-domain operation and provides feedback to control excitation of the first and second transmitters to cancel direct signals from the first and second transmitter coils. Element 11: further comprising a receiver coil axially interposing the first and second antenna coils and used in frequency-domain operation to cancel direct signals from the first and second antenna coils.

Element 12: wherein transmitter coils of the first and second pairs of transmitter coils are each wired independently and are excited by synchronized independent power sources, and excitation signals in the transmitter coils are controlled with a control to generate a desired field pattern. Element 13: wherein the control generates a shallow mode at a first frequency and a deep mode at a second frequency, where the first frequency is greater than the second frequency. Element 14: wherein a current of each transmitter coil of the first and second pairs of transmitter coils is controlled to simultaneously generate the first and second deep mode magnetic fields or the first and second shallow mode magnetic fields. Element 15: wherein at least one of the first and second pairs of transmitter coils comprises a plurality of transmitter coils, where each transmitter coil is excited independently and an excitation magnitude and phase of each transmitter coil is controlled to generate a desired field pattern.

Element 16: wherein at least one the signals of the receiver coil antennas is used as feedback to control an excitation current of at least one of the plurality of transmitter coils.

By way of non-limiting example, exemplary combinations applicable to A, B, and C include: Element 3 with Element 4; Element 3 with Element 5; Element 3 with Element 5; Element 7 with Element 8; Element 7 with Element 9; Element 7 with Element 10; Element 12 with Element 13; Element 12 with Element 14; and Element 12 with Element 15.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. An electromagnetic sensor for a pipe inspection tool, comprising:
   a first coil antenna having a wire wrapped about a first core in a first direction;
   a second coil antenna axially offset from the first coil and having the wire wrapped about a second core in a second direction; and
   a power source coupled to the wire, wherein, when excited by the power source, the first coil antenna generates a first magnetic field in a first polar orientation and the second coil antenna generates a second magnetic field in a second polar orientation opposite to the first polar orientation,
   wherein the power source is configured to selectively excite the first coil antenna and the second coil antenna,
   wherein selectively exciting the first coil antenna and the second coil antenna configures the first coil antenna and the second coil antenna for a deep mode or a shallow mode,
   wherein the wire wrapped about the first core is a first wire, the first coil antenna is a first transmitter coil, the wire wrapped about the second core is a second wire, and the second coil antenna is a second transmitter coil, and
   wherein the first and second transmitter coils are excited at a first frequency by separate power sources, and the separate power sources are synchronized to produce a fixed phase relation between the first and second transmitter coils.

2. The electromagnetic sensor of claim 1, wherein the first and second cores are axially-offset from each other and an air gap is provided therebetween.

3. The electromagnetic sensor of claim 1, wherein the first and second cores comprise a monolithic core with a reduced diameter between the first and second coil antennas.

4. The electromagnetic sensor of claim 1, wherein the fixed phase relation is adjustable based on feedback to achieve a desired phase relation between the first and second transmitter coils.

5. The electromagnetic sensor of claim 1, further comprising:
   a first receiver coil collocated with the first transmitter coil and formed with a third wire wrapped about the first core; and
   a second receiver coil collocated with the second transmitter coil and formed with the third wire wrapped about the second core.

6. The electromagnetic sensor of claim 1, wherein a radius of at least one of the first and second transmitter coils is different from a radius of the first and second receiver coil antennas.

7. The electromagnetic sensor of claim 1, further comprising a receiver grid axially interposing the first and second coil antennas and including a plurality of cells, wherein at least some of the cells of the plurality of cells include a receiver coil that senses the first and second magnetic fields.

8. The electromagnetic sensor of claim 7, wherein the receiver coils of the receiver grid are spread along an azimuthal direction with respect to the first and second coil antennas.

9. The electromagnetic sensor of claim 7, wherein a radial position of the receiver grid is adjacent to an inner surface of a wellbore pipe.

10. The electromagnetic sensor of claim 7, wherein the receiver grid is used in frequency-domain operation and provides feedback to control excitation of the first and second transmitter coils to cancel direct signals from the first and second transmitter coils.

11. The electromagnetic sensor of claim 1, further comprising a receiver coil axially interposing the first and second antenna coils and used in frequency-domain operation to cancel direct signals from the first and second coil antennas.

12. An electromagnetic sensor for a pipe inspection tool, comprising:
a first pair of transmitter coils that generates a first shallow mode magnetic field in a first polar orientation and a first deep mode magnetic field in the first polar orientation; and
a second pair of transmitter coils axially offset from the first pair of transmitter coils to generate a second shallow mode magnetic field in a second polar orientation and a second deep mode magnetic field in the second polar orientation, wherein the second polar orientation is opposite the first polar orientation,
wherein transmitter coils of the first and second pairs of transmitter coils are each wired independently to an independent power source and are excited at a first frequency by each power source to produce a deep mode or a shallow mode, and
wherein each independent power source are controlled with a control to generate a desired field pattern and select the shallow mode or the deep mode.

13. The electromagnetic sensor of claim 12, wherein the control generates the shallow mode at the first frequency and the deep mode at a second frequency, where the first frequency is greater than the second frequency.

14. The electromagnetic sensor of claim 12, wherein a current of each transmitter coil of the first and second pairs of transmitter coils is controlled to simultaneously generate the first and second deep mode magnetic fields or the first and second shallow mode magnetic fields.

15. The electromagnetic sensor of claim 12, wherein at least one of the first and second pairs of transmitter coils comprises a plurality of transmitter coils, where each transmitter coil is excited independently and an excitation magnitude and phase of each transmitter coil is controlled to generate a desired field pattern.

* * * * *